US010393342B2

(12) United States Patent
Feil et al.

(10) Patent No.: US 10,393,342 B2
(45) Date of Patent: Aug. 27, 2019

(54) LIGHTING DEVICE FOR A MOTOR VEHICLE AND MOTOR VEHICLE HAVING THE LIGHTING DEVICE

(71) Applicant: OSRAM GmbH, Munich (DE)

(72) Inventors: Thomas Feil, Iggingen (DE); Daniel Weissenberger, Giengen (DE); Martin Petzold, Ellwangen (DE)

(73) Assignee: OSRAM GmbH., Munich (DE)

( * ) Notice: Subject to any disclaimer, the term of this patent is extended or adjusted under 35 U.S.C. 154(b) by 153 days.

(21) Appl. No.: 15/481,504

(22) Filed: Apr. 7, 2017

(65) Prior Publication Data

US 2017/0307169 A1 Oct. 26, 2017

(30) Foreign Application Priority Data

Apr. 21, 2016 (DE) ........................ 10 2016 206 753

(51) Int. Cl.

*B60Q 1/00* (2006.01)
*B60Q 1/26* (2006.01)
*F21V 3/04* (2018.01)
*F21V 8/00* (2006.01)
*F21S 41/00* (2018.01)
*F21S 43/00* (2018.01)

(52) U.S. Cl.

CPC ............ *F21V 3/049* (2013.01); *B60Q 1/0005* (2013.01); *B60Q 1/0011* (2013.01); *F21S 41/00* (2018.01); *F21S 43/00* (2018.01); *G02B 6/0051* (2013.01); *B60Q 1/0035* (2013.01); *B60Q 1/2615* (2013.01); *G02B 6/0043* (2013.01); *G02B 6/0058* (2013.01)

(58) Field of Classification Search

CPC .. B60Q 1/2619; B60Q 1/2661; G02B 6/0043; G02B 6/0058

See application file for complete search history.

(56) References Cited

U.S. PATENT DOCUMENTS 5,931,555 A * 8/1999 Akahane .............. G02B 6/0036 349/64
9,393,905 B2 * 7/2016 Salter ....................... B60Q 1/52
2003/0007342 A1 * 1/2003 Suzuki ................. G02B 6/0036 362/617
2006/0114684 A1 * 6/2006 Marquez ............. B60Q 1/2661 362/487
2007/0268718 A1 11/2007 Chen et al.

(Continued)

FOREIGN PATENT DOCUMENTS

DE 102007015703 A1 11/2007
DE 102007015747 A1 10/2008

(Continued)

OTHER PUBLICATIONS

Machine translation of Wimbert et al., EP 2796322 A1, published Oct. 29, 2014 (Year: 2014).*

(Continued)

*Primary Examiner* — William N Harris

(57) ABSTRACT

In various embodiments, a lighting device for a motor vehicle is provided. The lighting device includes at least one light source, and at least one layer of a lacquer embodied such that light may be coupled into the lacquer for achieving a luminous effect. Scattering particles are provided in the lacquer for output coupling of the light.

12 Claims, 1 Drawing Sheet

(56) References Cited

U.S. PATENT DOCUMENTS

| | | | | |
|---|---|---|---|---|
| 2014/0254186 A1* | 9/2014 | Terai | G02B 6/0095 | 362/487 |
| 2015/0234114 A1* | 8/2015 | Nakashima | G02B 6/0036 | 362/611 |
| 2015/0291085 A1* | 10/2015 | Manning | B60Q 1/2619 | 362/516 |
| 2017/0003439 A1* | 1/2017 | Lee | G02B 6/0058 | |
| 2017/0368986 A1* | 12/2017 | Benboujema | F21S 43/00 | |

FOREIGN PATENT DOCUMENTS

| | | | |
|---|---|---|---|
| DE | 102012003200 | A1 | 8/2013 |
| DE | 102014206238 | A1 | 12/2014 |
| EP | 2796322 | A1 | 10/2014 |

OTHER PUBLICATIONS

German Search Report based on application No. 10 2016 206 753.2 (8 pages) dated Mar. 23, 2017 (Reference Purpose Only).

* cited by examiner

LIGHTING DEVICE FOR A MOTOR VEHICLE AND MOTOR VEHICLE HAVING THE LIGHTING DEVICE

CROSS-REFERENCE TO RELATED APPLICATION

This application claims priority to German Patent Application Serial No. 10 2016 206 753.2, which was filed Apr. 21, 2016, and is incorporated herein by reference in its entirety.

TECHNICAL FIELD

Various embodiments relate generally to a lighting device for a motor vehicle, e.g. for front lighting, side lighting, rear lighting and/or signal lighting, by means of which a motor vehicle is made visible for pedestrians and/or other road users at night or in dangerous situations.

BACKGROUND

Conventionally, a lighting device is provided in a separate housing with a transparent covering pane to this end.

In order to ensure minimum identifiability in the case of an activated lighting device, a certain minimum size of the lighting device and hence of the separate housing is required, even though the light sources accommodated therein may require less space. However, this minimum size also has disadvantages in terms of the design freedom for the lighting device and the motor vehicle.

Document DE 10 2007 015 703 A1 discloses a motor vehicle with an external lacquer, wherein the motor vehicle includes a fluorescent and/or phosphorescent substance admixed to the external lacquer or to part of the external lacquer for emitting light in a visible range when irradiated by light in a non-visible range. This should create a motor vehicle comprising a lighting device which is virtually invisible to an observer in the non-luminous state. However, the solution proposed in this document has no influence on the size of the lighting device and/or on the size of the housing of the lighting device.

SUMMARY

In various embodiments, a lighting device for a motor vehicle is provided. The lighting device includes at least one light source, and at least one layer of a lacquer embodied such that light may be coupled into the lacquer for achieving a luminous effect. Scattering particles are provided in the lacquer for output coupling of the light.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
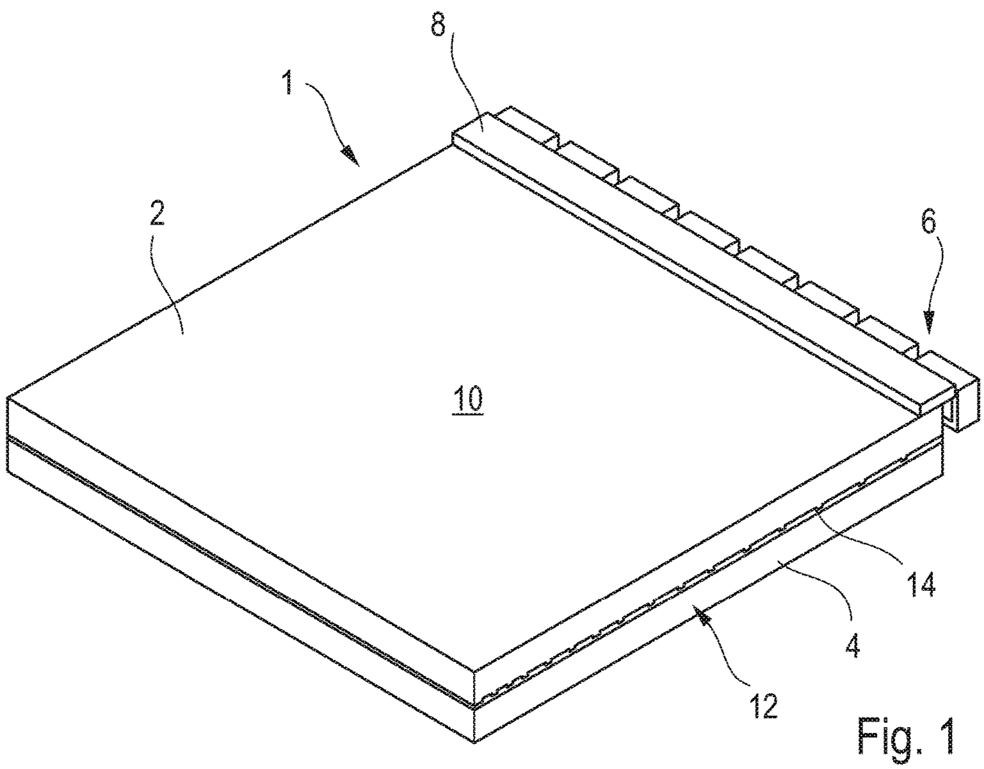
FIG. 1 shows a perspective illustration of an exemplary embodiment of a lighting device according to various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The vehicle may be an aircraft or a water-bound vehicle or a land-bound vehicle. The land-bound vehicle may be a motor vehicle, a rail vehicle or a bicycle. The use of the lighting device may be provided in a truck or automobile or motorbike.

Various embodiments provide a lighting device for motor vehicles which no longer requires accommodation in a housing, e.g. with a transparent cover pane, or at least to reduce the size of the housing.

Furthermore, various embodiments provide a motor vehicle including the lighting device according to various embodiments, in which the design freedom for the lighting device and/or for the motor vehicle is increased on account of the lacking requirement of accommodating the lighting device in a housing and/or on account of the housing being able to have a comparatively small embodiment.

A lighting device according to various embodiments for a motor vehicle contains at least one light source and at least one layer of a lacquer embodied such that light may be coupled into the lacquer for achieving a luminous effect by means of the at least one light source. For output coupling of the light, e.g. for targeted output coupling of the light, the lacquer includes scattering particles which are provided, e.g. embedded, therein.

An effect of various embodiments is that a desired appearance at a light output surface of the lacquer is achievable by means of the scattering particles provided in the lacquer.

Lacquer within the meaning of the present invention includes a liquid or powdery coating material or a plastic layer, which can be applied by means of spraying and/or injecting and/or immersing and/or brushing and/or rolling and/or an electrostatic injection method and/or laminating. By way of example, a lacquer may contain polymethylmethacrylate (PMMA) and/or polycarbonate (PC) and/or polyurethane (PU) and/or silicone.

The at least one light source may be a light emitting diode (LED) or an organic light emitting diode (OLED) or a laser diode or, particularly if a plurality of light sources are provided, a combination of one or more LEDs and/or OLEDs and/or laser diodes.

A light-emitting diode (LED) may be present in the form of at least one individually packaged light-emitting diode or in the form of at least one LED chip. Alternatively, or additionally, a plurality of LED chips may be assembled on a common substrate ("submount"). The at least one LED may be equipped with at least one dedicated and/or common optical unit for beam guidance, e.g. at least one Fresnel lens, collimator, etc. Instead of, or in addition to, inorganic LEDs, e.g. on the basis of InGaN or AlInGaP, use may generally also be made of organic LEDs (OLEDs, e.g. polymer OLEDs). Alternatively, the LED may be a laser diode or a laser diode arrangement. The emission wavelength of the LED may lie in the ultraviolet, visible or infrared spectral range.

In various embodiments, a concentration of the scattering particles differs, at least in portions, depending on the distance thereof from the light source. In various embodiments, the concentration of the scattering particles increases with increasing distance thereof from the light source. As an alternative thereto, the concentration of the scattering particles decreases with increasing distance thereof from the light source. As a result, a different luminance is achievable depending on the concentration of the scattering particles, said luminance being settable by means of the respective concentration of the scattering particles according to requirements.

Alternatively, or in addition thereto, the concentration of the scattering particles may be constant, at least in portions, independently of the distance thereof from the light source.

In various embodiments, at least one structure, e.g. a reflection structure and/or output coupling structure is embodied on and/or under the lacquer for the purposes of influencing a luminance curve. As a result, the luminance curve may additionally be influenced according to requirements.

An extent of the at least one structure, e.g. the reflection structure and/or output coupling structure, may have a different embodiment depending on the distance thereof from the light source. In various embodiments, the extent of the at least one structure increases with increasing distance thereof from the light source. The at least one structure, e.g. reflection structure and/or output coupling structure, may e.g. contain a mirrored region and/or notch structure, the at least one side surface of which is inclined in the direction of an output coupling opening. As an alternative thereto, the extent of the at least one structure, e.g. reflection structure and/or output coupling structure, decreases with increasing distance thereof from the light source. This provides a further option for influencing the luminance curve of the light output coupled by way of the scattering particles provided in the lacquer.

As an alternative, or in addition thereto, the extent of the at least one structure, e.g. reflection structure and/or output coupling structure, may be the same size, independently of the distance thereof from the light source.

The at least one structure, e.g. reflection structure and/ output coupling structure, may be provided as an elevation or depression in the light output surface and/or in a surface facing away from the light output surface.

A plurality of structures, in particular reflection structures and/output coupling structures, may be provided, e.g. in combination with one another.

In various embodiments, the distance between respectively two structures, e.g. adjacent structures, e.g. reflection structures and/or output coupling structures, decreases with increasing distance thereof from the light source. As an alternative thereto, a distance between respectively two structures, e.g. adjacent structures, e.g. reflection structures and/or output coupling structures, increases with increasing distance thereof from the light source. By means of the respectively different distance between the structures depending on the respective distance thereof from the light source, the luminance curve may be influenced according to requirements, in addition to the aforementioned different concentration of the scattering particles.

Alternatively, or in addition thereto, the distance between respectively two structures, e.g. reflection structures and/or output coupling structures, may be the same in each case, independently of the distance thereof from the light source.

In various embodiments, the luminance curve is homogeneous or increases or decreases along a preferred direction. As a result thereof, and/or by means of a combination of the aforementioned features, it is possible, in accordance with different prescriptions, to fit the luminance curve to a desired appearance of the light output coupled by means of the scattering particles provided in the lacquer and/or by means of the respectively formed least one structured.

The light may be coupled into the lacquer directly by means of the light source or by way of an interposed optical element. As a result, it is possible, for example, to increase or decrease an intensity of the input coupled light and/or the input coupled light may be fanned open or focused.

The light coupled into the lacquer may be visible light.

The light coupled into the lacquer may be monochromatic light, for example blue light, green light, yellow light or red light, or polychromatic light. In various embodiments, the light coupled into the lacquer may be white light. In various embodiments, the light sources, the emitted light of which is input coupled, may emit light in different colors which is then mixed within the lacquer layer.

In various embodiments, the lacquer includes at least one portion embodied in a light-guiding fashion and at least one portion embodied in a non-light-guiding fashion. This allows individual signatures to be generated, as result of which a multiplicity of optical appearances emerge which, for example, may be used as a delimiting feature for a specific driving state and/or for a specific traffic situation and/or for different car manufacturers, for example for a brand logo, and/or for different vehicle types. Further, it is possible to couple the input coupling of the light into the lacquer to a vehicle function such that, for example, red light is coupled into the lacquer layer in the case of a braking process and/or yellow light in the case of a signaling process.

In various embodiments, the lacquer layer is embodied on a carrier material.

For the purposes of the input coupling of the light, the at least one light source may be arranged at the lacquer layer at an end face.

In various embodiments, a plurality of light sources may be arranged next to one another at the lacquer layer at an end face.

In various embodiments, a thickness of the light source approximately corresponds to a thickness of the lacquer layer.

A stop may cover, at least in portions, the lacquer layer and/or the light source and/or an interstice situated between the lacquer layer and the light source. Hence, stray light becomes avoidable, e.g. when bridging the interstice between the light source and the lacquer.

In various embodiments, the stop at least partly covers the at least one light source and/or light emitted by the at least one light source is prevented from directly emerging from the at least one light source.

The at least one structure, e.g. reflection structure and/or output coupling structure, may be formed on the carrier material. Hence, design freedom is provided when applying the structure to the lacquer and/or the carrier material, e.g. in conjunction with the aforementioned features for attaching the at least one structure.

A motor vehicle according to various embodiments including an external lacquer applied to the vehicle body thereof and/or to at least one attachment part arranged thereon includes a lighting device in accordance with various embodiments, wherein the lacquer is applied to the vehicle body and/or to the at least one attachment part.

Hence, the motor vehicle according to various embodiments also has the effects mentioned above in relation to the lighting device according to various embodiments.

In various embodiments, a surface of the vehicle body and/or of the at least one attachment part is designed, at least in part, for targeted output coupling of the light. By way of example, this may achieve a multiplicity of optical appearances which, for example, may be used as a delimiting feature for a specific driving state and/or vehicle state and/or for a specific traffic situation and/or for different car manufacturers, for example for a brand logo, and/or for different vehicle types.

In various embodiments, for the purposes of targeted output coupling of the light, a coating exhibiting diffuse reflection and/or specular reflection and/or partial absorption is applied, at least in part, under the lacquer to the surface of the vehicle body and/or to the surface of the at least one attachment part. As a result, a further influencing option is provided for targeted output coupling of the light.

In various embodiments, at least one structure, e.g. a reflection structure and/or output coupling structure, is formed for the purposes of influencing of a luminance curve on the surface of the vehicle body and/or on the surface of the at least one attachment part, respectively on and/or under the lacquer. As a result, the luminance curve may be fitted to different requirements.

In various embodiments, a cleaning installation is provided in a region of the vehicle body with the lighting device. This ensures that there is no negative impairment of the desired appearance as a result of dirtying.

The lighting device 1 according to various embodiments, depicted in FIG. 1, contains a layer of a lacquer 2 which, in this embodiment, is applied to a carrier material 4. By means of a plurality of light sources 6 arranged next to one another, light required to obtain a luminous effect may be coupled into the lacquer 2 at an end face of the lacquer layer 2. The height or thickness of the light sources 6 approximately corresponds to the layer thickness of the lacquer 2. The height or thickness of the light sources and the layer thickness of the lacquer is less than 1 mm in each case, for example 0.7 mm. In the embodiment shown here, a stop 8 is arranged between the light source 6 and the lacquer layer 2, e.g. for the purposes of avoiding stray light. Here, the stop 8 is arranged externally and said stop covers a portion of the lacquer layer 2 and a portion of the light sources 6, and also covers an interstice situated between the lacquer layer 2 and the light sources 6. In various embodiments, the stop 8 shields a beam path between the light sources 6 and the lacquer 2 to the outside.

Light coupled into the lacquer layer 2 may be output coupled from the lacquer 2 in a targeted manner by means of scattering particles (not depicted) situated in the lacquer 2. A desired appearance at a light output surface 10 of the lacquer 2 may be influenced by means of a concentration of the scattering particles in the lacquer 2.

Figure 2:
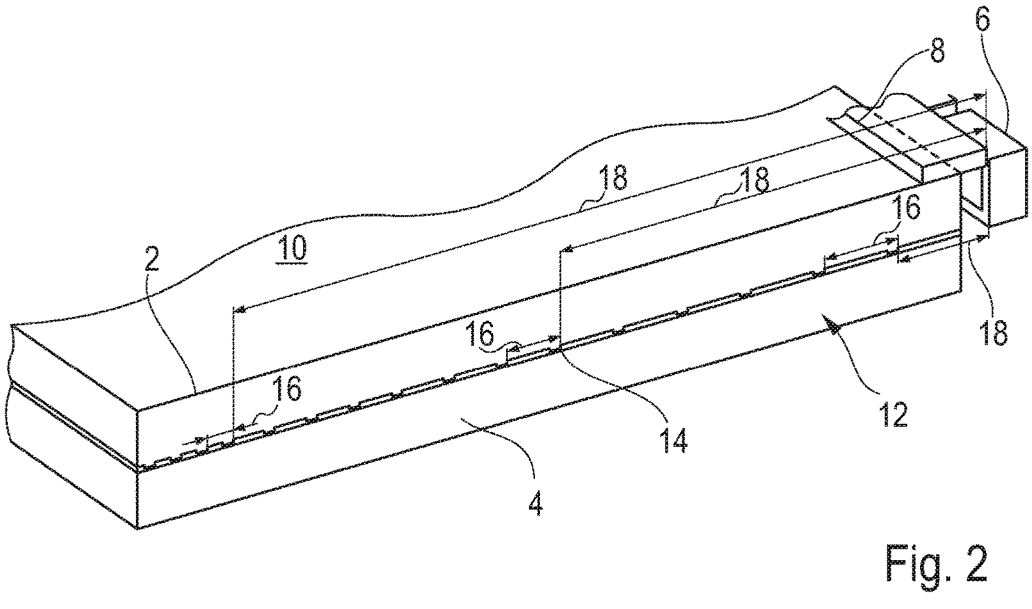
FIG. 2 shows a detail of the lighting device depicted in FIG. 1, depicted in a magnified fashion.

In the magnified detail of the lighting device 1 from FIG. 1, depicted in FIG. 2, a plurality of structures 14, which are embodied as reflection structures and/or output coupling structures 14 here, are provided at a surface 12 of the lacquer layer 2 facing away from the light output surface 10. As may be seen, the distances 16 between the individual structures 14 are different depending on the distance 18 thereof from the light source 6. In the embodiment depicted here, the distances 16 decrease with the distance 18 from the light source 6. Hence, a luminance curve of the light output coupled at the light output surface 10 of the lacquer layer 2 may be influenced.

A lighting device for a motor vehicle is disclosed, said lighting device including at least one layer of a lacquer, wherein light may be input coupled into the lacquer by means of at least one light source for achieving a luminous effect. Scattering particles are provided in the lacquer for the purposes of targeted output coupling of the light. Hence, it is no longer necessary to accommodate the lighting device in a housing with, for example, a transparent covering pane and/or the housing of the lighting device may be reduced since one or more lighting functions and/or parts of the lighting functions may be transferred out of the housing. Alternatively, or in addition thereto, a luminous surface of the lighting device may therefore be embodied in a substantially enlarged manner independently of lighting functions realized in the lighting device, as result of which the visibility of the lighting device is improved, e.g. during the day and/or at dawn/dusk and/or in the night. Further, this increases freedom when designing the lighting device. Moreover, a motor vehicle including the lighting device according to various embodiments is disclosed, as a result of which the features and effects specified in relation to the lighting device according to various embodiments also apply to the motor vehicle according to various embodiments, e.g. the increase in the visibility and the increase in the freedom when designing the lighting device, and hence the motor vehicle.

LIST OF REFERENCE SIGNS

Lighting device 1
Lacquer 2
Carrier material 4
Light source 6
Stop 8
Light output surface 10
Surface facing away from the light output surface 12
Structure/reflection structure and/or output coupling structure 14
Distance between two structures 16
Distance of the structure from the light source 18

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A lighting device for a motor vehicle, the lighting device comprising:
- at least one light source; and
- at least one layer of a lacquer embodied such that light is coupled into the lacquer for achieving a luminous effect;
- wherein scattering particles are provided in the lacquer for output coupling of the light;
- at least one reflection structure or output coupling structure on the lacquer for the purpose of influencing a luminance curve where the structure comprises at least one of:
  - on a light output surface of the lacquer, and
  - on a surface of the lacquer facing away from the light output surface;
- wherein the at least one reflection structure or output coupling structure is an elevation or a depression in the light output surface and/or the surface facing away from the light output surface.

2. The lighting device of claim 1,
wherein, at least in portions, a concentration of the scattering particles differs depending on the distance thereof from the light source or is constant independently of a distance thereof from the light source.

3. The lighting device of claim 1,
wherein an extent of at least one of the at least one reflection structure or output coupling structure increases with increasing distance thereof from the light source or decreases with increasing distance thereof from the light source.

4. The lighting device of claim 1,
wherein provision is made of a plurality of at least one of reflection structures or output coupling structures; and
wherein a distance between at least one of two reflection structures or output coupling structures in each case decreases with increasing distance thereof from the light source or increases with increasing distance thereof from the light source.

5. The lighting device of claim 1,
wherein a luminance of the lighting device is homogeneous or increases or decreases along a preferred direction.

6. The lighting device of claim 1,
wherein light is coupled into the lacquer directly by means of the light source.

7. The lighting device of claim 1,
wherein a stop covers, at least in portions, at least one of the layer of the lacquer or the light source or an interstice situated between the layer of the lacquer and the light source.

8. The lighting device of claim 1,
wherein the lacquer is embodied as a liquid or powdery coating material or as a plastic layer, which is applied by means of at least one of the following:
spraying;
injecting;
immersing;
brushing;
rolling;
an electrostatic injection method; or
laminating.

9. The lighting device of claim 1,
wherein the lacquer comprises at least one portion embodied in a light-guiding fashion and at least one portion embodied in a non-light-guiding fashion.

10. The lighting device of claim 1,
wherein the lacquer is embodied on a carrier material and wherein the light source is arranged on the layer of the lacquer at an end face for the purposes of coupling in the light.

11. The lighting device of claim 1,
wherein provision is made of a plurality of at least one of reflection structures or output coupling structures; and
wherein a distance between at least one of two reflection structures or output coupling structures in each case remains the same.

12. The lighting device of claim 1,
wherein a height of the light source corresponds to a thickness of the lacquer layer.

* * * * *